(12) United States Patent  (10) Patent No.: US 7,704,456 B2
Shirakura  (45) Date of Patent: Apr. 27, 2010

(54) $NO_x$ REMOVAL CATALYST MANAGEMENT UNIT FOR $NO_x$ REMOVAL APPARATUS AND METHOD FOR MANAGING $NO_x$ REMOVAL CATALYST

(75) Inventor: Shigeo Shirakura, Hiroshima (JP)

(73) Assignee: The Chugoku Electric Power Co., Inc., Hiroshima (JP)

( * ) Notice: Subject to any disclaimer, the term of this patent is extended or adjusted under 35 U.S.C. 154(b) by 1271 days.

(21) Appl. No.: 10/517,665

(22) PCT Filed: Jun. 13, 2003

(86) PCT No.: PCT/JP03/07538

§ 371 (c)(1),
(2), (4) Date: Aug. 5, 2005

(87) PCT Pub. No.: WO03/106001

PCT Pub. Date: Dec. 24, 2003

(65) Prior Publication Data

US 2006/0099110 A1    May 11, 2006

(30) Foreign Application Priority Data

Jun. 14, 2002 (JP) .............................. 2002-174304

(51) Int. Cl.
*G01N 21/00* (2006.01)
(52) U.S. Cl. .............................. 422/62; 422/63; 422/64
(58) Field of Classification Search .............. 422/62–64
See application file for complete search history.

(56) References Cited

U.S. PATENT DOCUMENTS 6,092,367 A    7/2000  Dölling
2002/0127153 A1 *  9/2002  Ganeshan ................... 422/177

FOREIGN PATENT DOCUMENTS

| DE | 44 35 103 A1 | 4/1996 |
| EP | 0 262 558 A1 | 4/1988 |
| GB | 2 132 112 A | 7/1984 |
| JP | 7-47108 | 5/1995 |

(Continued)

OTHER PUBLICATIONS

International Search Report for PCT/JP03/07538 dated Sep. 9, 2003.

*Primary Examiner*—Yelena G Gakh
*Assistant Examiner*—David Weisz
(74) *Attorney, Agent, or Firm*—Sughrue Mion, PLLC

(57) ABSTRACT

To provide an $NO_x$ removal catalyst management unit for use with an $NO_x$ removal apparatus, the management unit detecting an $NO_x$ removal catalyst layer that is actually deteriorated, whereby the deteriorated catalyst layer can be effectively replaced by a new catalyst layer, and to provide a method for managing the $NO_x$ removal catalyst. The management unit for managing a plurality of $NO_x$ removal catalyst layers provided in a flue gas $NO_x$ removal apparatus includes $NO_x$ measurement means 16A through 16E for determining NOx concentrations on the inlet and outlet sides of respective $NO_x$ removal catalyst layers 14A through 14D; $NH_3$ measurement means 17A through 17E for determining $NH_3$ concentrations on the inlet and outlet sides of the same $NO_x$ removal catalyst layers; and percent NOx removal determination means 18 for determining percent $NO_x$ removal ($\eta$) on the basis of an inlet mole ratio (i.e., inlet $NH_3$/inlet $NO_x$).

7 Claims, 1 Drawing Sheet

FOREIGN PATENT DOCUMENTS

| | | |
|---|---|---|
| JP | 7-47108 B2 | 5/1995 |
| JP | 747108 B2 * | 5/1995 |
| JP | 10-109018 | 4/1998 |
| JP | 10-109018 A | 4/1998 |
| JP | 10109018 A * | 4/1998 |

* cited by examiner

US 7,704,456 B2

$NO_x$ REMOVAL CATALYST MANAGEMENT UNIT FOR $NO_x$ REMOVAL APPARATUS AND METHOD FOR MANAGING $NO_x$ REMOVAL CATALYST

TECHNICAL FIELD

The present invention relates to an $NO_x$ removal catalyst management unit for use with an $NO_x$ removal apparatus, the management unit being provided for carrying out performance management on an $NO_x$ removal catalyst included in a flue gas $NO_x$ removal apparatus installed in a facility such as a thermal power station, and to a method for managing the $NO_x$ removal catalyst.

BACKGROUND ART

Conventionally, boilers provided in thermal power stations and a variety of large-scale boilers employing a fuel such as petroleum, coal, or fuel gas, waste incinerators, and similar apparatuses have been equipped with a flue gas $NO_x$ removal apparatus which contains a plurality of $NO_x$ removal catalyst layers.

The above employed $NO_x$ removal catalysts assume the form of honeycomb, plate, etc. During use, the catalytic performance of the catalysts is problematically deteriorated with elapse of time as a result of deposition, on the surface of the catalyst, of a substance which deteriorates the catalytic performance (hereinafter referred to as deteriorating substance) or through migration of the dissolved deteriorating substance into the catalyst.

Conventionally, the performance of the $NO_x$ removal catalysts has been managed by measuring $NO_x$ concentration and unreacted $NH_3$ concentration on the inlet and outlet sides of respective catalysts. When a drop in total performance of a catalyst system is confirmed, old catalysts are replaced with new catalysts or regenerated catalysts in order of use age, and such replacement is carried out periodically.

Generally, $NO_x$ removal catalysts are very expensive. Thus, there has been proposed one approach for prolonging the service life of the $NO_x$ removal catalysts to as long a duration as possible by assessing the performance of each unit catalyst (Japanese Patent Publication (kokoku) No. 7-47108).

However, the aforementioned catalyst managing method has a drawback. According to the method, $NO_x$ concentration and unreacted $NH_3$ concentration of each catalyst layer are determined, and percent $NO_x$ removal and percent contribution of each catalyst layer are calculated from the determined $NO_x$ concentration. On the basis of these values, performance-deteriorated catalysts are replaced with new catalysts in order of degree of deterioration. In this case, when the catalytic performance is evaluated by the percent contribution calculated on the basis of the $NO_x$ concentration, the catalyst layer(s) having actually deteriorated performance cannot be detected correctly.

In view of the foregoing, an object of the present invention is to provide an $NO_x$ removal catalyst management unit for use with an $NO_x$ removal apparatus, the management unit detecting an $NO_x$ removal catalyst layer that is actually deteriorated, whereby the deteriorated $NO_x$ removal catalyst layer can be effectively replaced by a new catalyst layer. Another object of the invention is to provide a method for managing the $NO_x$ removal catalyst.

DISCLOSURE OF THE INVENTION

In order to attain the aforementioned objects, a first mode of the present invention provides an $NO_x$ removal catalyst management unit for use with an $NO_x$ removal apparatus, the management unit being provided for managing a plurality of $NO_x$ removal catalyst layers provided in a flue gas $NO_x$ removal apparatus, characterized in that the management unit comprises $NO_x$ measurement means for determining $NO_x$ concentrations on the inlet and outlet sides of respective $NO_x$ removal catalyst layers; $NH_3$ measurement means for determining $NH_3$ concentrations on the inlet and outlet sides of the same $NO_x$ removal catalyst layers; and percent $NO_x$ removal determination means for determining percent $NO_x$ removal ($\eta$) on the basis of an inlet mole ratio (i.e., inlet $NH_3$/inlet $NO_x$).

According to the first mode, $NO_x$ concentrations and $NH_3$ concentrations are determined on the inlet and outlet sides of respective $NO_x$ removal catalyst layers, and the percent $NO_x$ removal ($\eta$) is determined on the basis of an inlet mole ratio. Therefore, the percent $NO_x$ removal, which is enhanced as the mole ratio increases, can be evaluated on an absolute basis and correctly.

A second mode of the present invention is drawn to a specific embodiment of the $NO_x$ removal catalyst management unit of the first mode for use with an $NO_x$ removal apparatus, wherein the percent $NO_x$ removal ($\eta$) is determined on the basis of $NH_3$ concentrations.

According to the second mode, the percent $NO_x$ removal ($\eta$) of each and every $NO_x$ removal catalyst layer is determined on the basis of $NH_3$ concentrations rather than on the basis of $NO_x$ concentrations. Therefore, the catalytic performance can be detected with smaller variation.

A third mode of the present invention is drawn to a specific embodiment of the $NO_x$ removal catalyst management unit of the second mode for use with an $NO_x$ removal apparatus, wherein the percent $NO_x$ removal ($\eta$) is determined on the basis of the following equation (1):

$$\eta = \{(\text{inlet } NH_3 - \text{outlet } NH_3)/(\text{inlet } NH_3 - \text{outlet } NH_3 + \text{outlet } NO_x)\} \times 100 \times (\text{evaluation mole ratio/inlet mole ratio}) \quad (1).$$

According to the third mode, the percent $NO_x$ removal ($\eta$) of respective $NO_x$ removal catalyst layers can be detected without variation and correctly, thereby managing respective $NO_x$ removal catalysts successfully and effectively.

A fourth mode of the present invention is drawn to a specific embodiment of the $NO_x$ removal catalyst management unit of any of the first to third modes for use with an $NO_x$ removal apparatus, which management unit further includes transmission means for transmitting concentration values determined by the $NO_x$ measurement means and the $NH_3$ measurement means to the percent $NO_x$ removal determination means, wherein the percent $NO_x$ removal determination means determines the percent $NO_x$ removal ($\eta$) of respective $NO_x$ removal catalyst layers included in a plurality of flue gas $NO_x$ removal apparatuses.

According to the fourth mode, $NO_x$ removal catalysts included in a plurality of flue gas $NO_x$ removal apparatuses can be collectively managed, thereby effectively managing $NO_x$ removal catalysts.

A fifth mode of the present invention provides a method for managing an $NO_x$ removal catalyst for use with an $NO_x$ removal apparatus, the method being provided for managing a plurality of $NO_x$ removal catalyst layers provided in a flue gas $NO_x$ removal apparatus, characterized in that the method comprises determining $NO_x$ concentrations and $NH_3$ concentrations on the inlet and outlet sides of respective $NO_x$ removal catalyst layers; determining percent $NO_x$ removal ($\eta$) on the basis of an inlet mole ratio (i.e., inlet $NH_3$/inlet $NO_x$); and evaluating performance of respective $NO_x$ removal catalyst layers on the basis of the percent $NO_x$ removal ($\eta$).

According to the fifth mode, $NO_x$ concentrations and $NH_3$ concentrations are determined on the inlet and outlet sides of respective $NO_x$ removal catalyst layers, and the percent $NO_x$ removal ($\eta$) is determined on the basis of an inlet mole ratio. Therefore, the percent $NO_x$ removal, which is enhanced as the mole ratio increases, can be evaluated on an absolute basis and correctly.

A sixth mode of the present invention is drawn to a specific embodiment of the method for managing an $NO_x$ removal catalyst of the fifth mode for use with an $NO_x$ removal apparatus, wherein the percent $NO_x$ removal ($\eta$) is determined on the basis of $NH_3$ concentrations.

According to the sixth mode, the percent $NO_x$ removal ($\eta$) of respective $NO_x$ removal catalyst layers is determined on the basis of $NH_3$ concentrations rather than on the basis of $NO_x$ concentrations. Therefore, the catalytic performance can be detected without variation.

A seventh mode of the present invention is drawn to a specific embodiment of the method for managing an $NO_x$ removal catalyst of the sixth mode for use with an $NO_x$ removal apparatus, wherein the percent $NO_x$ removal ($\eta$) is determined on the basis of the following equation (1):

$$\eta = \{(\text{inlet NH}_3 - \text{outlet NH}_3)/(\text{inlet NH}_3 - \text{outlet NH}_3 + \text{outlet NO}_x)\} \times 100 \times (\text{evaluation mole ratio/inlet mole ratio}) \quad (1).$$

According to the seventh mode, the percent $NO_x$ removal of each $NO_x$ removal catalyst layer can be detected without variation and correctly, thereby managing respective $NO_x$ removal catalysts successfully and effectively.

An eighth mode of the present invention is drawn to a specific embodiment of the method for managing an $NO_x$ removal catalyst of any of the fifth to seventh modes for use with an $NO_x$ removal apparatus, wherein the method further comprises performing restoration treatment of an $NO_x$ removal catalyst layer having a catalytic performance deteriorated to a predetermined level, on the basis of results of performance evaluation of the respective $NO_x$ removal catalyst layers.

According to the eighth mode, the percent $NO_x$ removal of each $NO_x$ removal catalyst layer is determined without variation and correctly, and the performance restoration treatment is carried out on the basis of the results. Thus, respective $NO_x$ removal catalysts can be effectively used.

A ninth mode of the present invention is drawn to a specific embodiment of the method for managing an $NO_x$ removal catalyst of the eighth mode for use with an $NO_x$ removal apparatus, wherein the performance restoration treatment is replacement of the $NO_x$ removal catalyst layer with a new $NO_x$ removal catalyst layer, replacement of the $NO_x$ removal catalyst layer with a regenerated $NO_x$ removal catalyst layer, replacement of the $NO_x$ removal catalyst layer with an $NO_x$ removal catalyst layer inverted with respect to the direction of the flow of discharge gas, or replacement of the $NO_x$ removal catalyst layer with an $NO_x$ removal catalyst layer from which a deteriorated portion has been removed.

According to the ninth mode, the performance of deteriorated $NO_x$ removal catalysts can be restored through any of the above treatments.

A tenth mode of the present invention is drawn to a specific embodiment of the method for managing an $NO_x$ removal catalyst of any of the fifth to ninth modes for use with an $NO_x$ removal apparatus, wherein the method further comprises determining the percent $NO_x$ removal of respective $NO_x$ removal catalyst layers included in a plurality of flue gas $NO_x$ removal apparatuses and evaluating catalytic performance of respective $NO_x$ removal catalyst layers included in a plurality of flue gas $NO_x$ removal apparatuses.

According to the tenth mode, $NO_x$ removal catalysts included in a plurality of flue gas $NO_x$ removal apparatuses can be collectively managed, thereby effectively managing $NO_x$ removal catalysts.

As described hereinabove, the present invention employs an $NO_x$ removal catalyst management unit for use with an $NO_x$ removal apparatus, which management unit comprises $NO_x$ measurement means for determining $NO_x$ concentrations on the inlet and outlet sides of respective $NO_x$ removal catalyst layers; $NH_3$ measurement means for determining $NH_3$ concentrations on the inlet and outlet sides of the same $NO_x$ removal catalyst layers; and percent $NO_x$ removal determination means for determining percent $NO_x$ removal ($\eta$) on the basis of an inlet mole ratio (i.e., inlet $NH_3$/inlet $NO_x$). Therefore, the management unit detects an $NO_x$ removal catalyst layer that is actually deteriorated, whereby the deteriorated catalyst layer can be effectively replaced by a new catalyst layer.

BEST MODES FOR CARRYING OUT THE INVENTION

Figure 1:
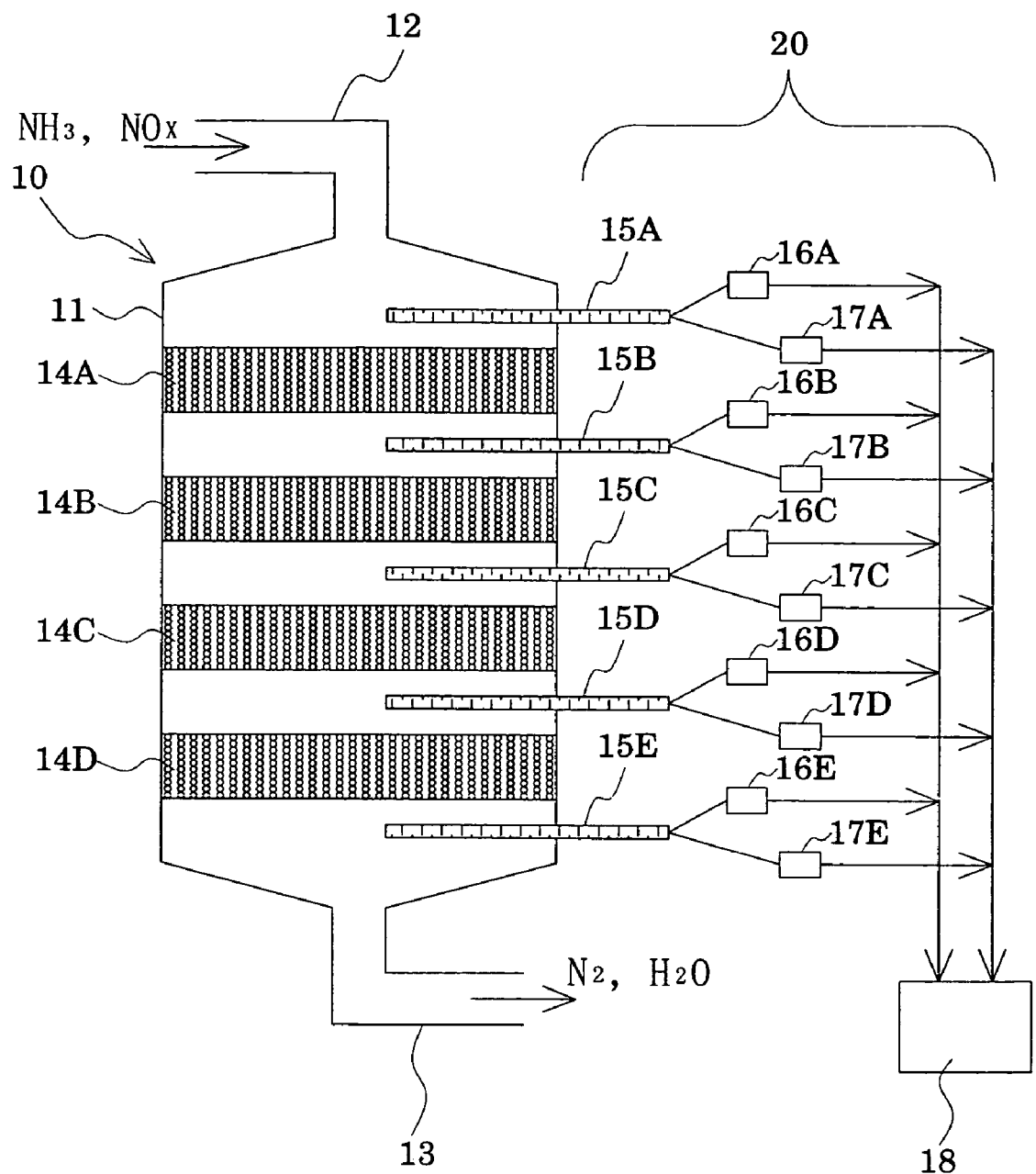
FIG. 1 schematically shows a configuration of a flue gas $NO_x$ removal apparatus equipped with an $NO_x$ removal catalyst management unit according to an embodiment of the present invention.

FIG. 1 schematically shows a configuration of a flue gas $NO_x$ removal apparatus equipped with an $NO_x$ removal catalyst management unit according to an embodiment of the present invention. Actually, the flue gas $NO_x$ removal apparatus is provided in a thermal power station. However, no particular limitation is imposed on the facility that includes the $NO_x$ removal catalyst management unit of the embodiment.

As shown in FIG. 1, a flue gas $NO_x$ removal apparatus 10 includes an exhaust duct 12 and a treated gas duct 13. The exhaust duct 12 is in communication with a boiler unit installed in a thermal power station that is connected with an apparatus body 11 on the upstream side. The treated gas duct 13 is connected with the apparatus body 11 on the downstream side. In the apparatus body 11, a plurality of $NO_x$ removal catalyst layers (4 layers in this embodiment) 14A to 14D are disposed at predetermined intervals. The $NO_x$ removal catalyst layers 14A to 14D are arranged so that a discharge gas introduced through the exhaust duct 12 is sequentially passed therethrough, and reduce the level of nitrogen oxide ($NO_x$) of the discharge gas through contact with the discharge gas passing through the catalyst layers. Notably, to the exhaust duct 12 communicating with the boiler unit, $NH_3$ is injected in an amount in accordance with the amount of the discharge gas fed from the boiler body.

No particular limitation is imposed on the type, shape, etc. of the catalysts 14A to 14D. Generally, each catalyst is composed of $TiO_2$ serving as a carrier and $V_2O_5$ serving as an active component. The catalysts assume the form of honeycomb, plate, etc.

In the present embodiment, each catalyst layer employs a catalyst in the form of columnar honeycomb, and a plurality of catalyst layers are arranged in combination, thereby forming the catalyst layers 14A to 14D.

An $NO_x$ removal catalyst management unit 20 of the present embodiment is provided with gas sampling means 15A through 15E on the inlet and outlet sides of respective $NO_x$ removal catalyst layers 14A through 14D. The gas sampling means 15A through 15E are connected with $NO_x$ concentration measurement means 16A through 16E and with $NH_3$ concentration measurement means 17A through 17E. The data obtained by the measurement means are transferred to a percent $NO_x$ removal determination means 18 for calculating percent $NO_x$ removal and percent $NO_x$ removal contribution of the respective $NO_x$ removal catalyst layers 14A through 14D.

The gas sampling means 15A through 15E sample, via sampling tubes, a gas to be sampled in a desired amount and at a desired timing, and subsequently feed the sampled gas to the $NO_x$ concentration measurement means 16A through 16E and to the $NH_3$ concentration measurement means 17A through 17E. Notably, the sampling tubes and similar parts which are in contact with a gas to be sampled are required to be made of a material which has a predetermined heat resistance and which is inert to the corresponding gas. In the present embodiment, the gas sampling means 15A through 15E feed the sampled gas to the $NO_x$ concentration measurement means 16A through 16E and to the $NH_3$ concentration measurement means 17A through 17E. However, needless to say, each of the $NO_x$ concentration measurement means 16A through 16E and the $NH_3$ concentration measurement means 17A through 17E may be provided with gas sampling means.

No particular limitation is imposed on the timing for sampling a gas by the gas sampling means 15A through 15E. Generally, sampling is carried out during usual operation of the power station, preferably at the nominal load where the amount of gas reaches the maximum, if possible. The interval between sampling operations may be prolonged to about six months, and the interval is sufficient for managing the performance of the $NO_x$ removal catalyst layers 14A through 14D. However, if the interval is shortened, precision in management is enhanced. Thus, the sampling is preferably carried out, for example, once every one to two months. Particularly, in a catalyst layer placed on the downstream side, variation of obtained data increases due to decrease in $NH_3$ concentration. Thus, in order to attain better management and evaluation, preferably, determination of $NH_3$ concentration is performed at short intervals, and percent $NO_x$ removal is calculated from an averaged $NH_3$ concentration value.

No particular limitation is imposed on the $NO_x$ concentration measurement means 16A through 16E and the $NH_3$ concentration measurement means 17A through 17E, so long as the measurement means can determine the $NO_x$ concentration measurement and the $NH_3$ concentration of the sample gas. Although an automated measuring apparatus is preferred, manual analysis means may also be employed. Needless to say, the $NO_x$ concentration and the $NH_3$ concentration may be directly determined by means of a sensor without sampling the gas.

As described above, the $NO_x$ concentration and the $NH_3$ concentration of the sampled gas are determined. In addition, oxygen or other components may also be determined, if required.

According to the present embodiment, $NO_x$ measurement means and $NH_3$ measurement means are provided on the inlet and outlet sides of respective $NO_x$ removal catalyst layers 14A through 14D. Alternatively, a single $NO_x$ concentration measurement means and a single $NH_3$ concentration measurement means are provided, and $NO_x$ concentrations and $NH_3$ concentrations on the inlet and outlet sides of respective $NO_x$ removal catalyst layers 14A through 14D may be analyzed sequentially. In this case, sampling of gas may be performed sequentially in accordance with measurement. Although time lags occur during sampling, they would not be any problem so long as the $NO_x$ removal operation proceeds consistently. However, it is preferred that sampling be simultaneously performed and the sampled gases be sequentially fed to the corresponding measurement means for analysis.

The percent $NO_x$ removal determination means 18 collects the measurement data from the $NO_x$ concentration measurement means 16A through 16E and the $NH_3$ concentration measurement means 17A through 17E, and calculates, from the measurement data, percent $NO_x$ removal and percent $NO_x$ removal contribution of respective $NO_x$ removal catalyst layers 14A through 14D. No particular limitation is imposed on the method of calculating percent $NO_x$ removal, and any method may be employed so long as the percent $NO_x$ removal is calculated on the basis of an inlet mole ratio (i.e., inlet $NH_3$/inlet $NO_x$) of the $NO_x$ removal catalyst layers 14A through 14D.

The reason for taking the inlet mole ratio into consideration is as follows. $NH_3$ is fed into an $NO_x$ removal apparatus in the vicinity of $NO_x$ removal catalysts on the upstream side in an amount proportional to that of the gas to be treated. The rate determining step of $NO_x$ removal reaction is a step of adsorbing $NH_3$ onto the catalysts. Therefore, it is most critical to detect $NH_3$ concentrations on the inlet and outlet sides of the $NO_x$ removal catalyst layers 14A through 14D upon management of the performance of the $NO_x$ removal catalyst layers 14A through 14D on the basis of $NH_3$ concentrations.

When calculated on the basis of an inlet mole ratio, the percent $NO_x$ removal may be calculated from $NO_x$ concentration or $NH_3$ concentration. However, $NH_3$-basis calculation provides percent $NO_x$ removal values of higher precision suitable for management.

An exemplary procedure of deriving percent $NO_x$ removal will next be described. The percent $NO_x$ removal ($\eta$) is determined on the basis of the following equation (2) employing $NO_x$ concentrations:

$$\eta = \{(\text{inlet } NO_x - \text{outlet } NO_x)/(\text{inlet } NO_x)\} \times 100 \times (\text{evaluation mole ratio/inlet mole ratio}) \quad (2).$$

As used herein, the term "evaluation mole ratio" refers to a mole ratio which is predetermined for the purpose of evaluating an $NO_x$ removal catalyst. The evaluation mole ratio may be predetermined to an arbitrary value; for example, 0.8, which is almost equal to a mole ratio typically employed for operating a power station.

Although the percent $NO_x$ removal ($\eta$) is determined on the basis of the equation employing $NO_x$ concentrations, target catalysts can be evaluated on the basis of a percent $NO_x$ removal value actually reflecting the conditions of a catalyst, since the equation employs an inlet mole ratio. In general, since the percent $NO_x$ removal increases with $NH_3/NO_x$, the percent $NO_x$ removal must be derived on the basis of the inlet mole ratio so as to evaluate catalysts in an actual state.

The percent $NO_x$ removal ($\eta$) is also determined on the basis of the following equation (1) employing $NH_3$ concentrations:

$$\eta=\{(\text{inlet } NH_3-\text{outlet } NH_3)/(\text{inlet } NH_3-\text{outlet } NH_3+ \text{outlet } NO_x)\}\times100\times(\text{evaluation mole ratio/inlet mole ratio}) \quad (1).$$

Since the percent $NO_x$ removal ($\eta$) is determined on the basis of the equation employing $NH_3$ concentrations, variation in the obtained percent $NO_x$ removal values is smaller as compared with the case in which the equation employing $NO_x$ concentrations is used, which is advantageous. Thus, catalysts can be evaluated on the basis of percent removal values with smaller variation.

According to the present invention, percent $NO_x$ removal ($\eta$) of respective $NO_x$ removal catalyst layers 14A through 14D is determined through a technique on the basis of the inlet mole ratio, and the performance of the catalysts is managed on the basis of the determined percent $NO_x$ removal values. Specifically, when the percent $NO_x$ removal of a certain catalyst drops below a predetermined level, the catalyst having deteriorated performance undergoes performance restoration treatment. According to the invention, a catalyst which has been most deteriorated or a catalyst having a lowered percent $NO_x$ removal value below a predetermined level is exclusively subjected to performance restoration treatment. Therefore, $NO_x$ removal catalysts can be effectively used without performing unnecessary restoration treatment.

As used herein, the term "performance restoration treatment" generally refers to replacement of deteriorated catalysts with new catalysts, replacement of deteriorated catalysts with catalysts which have been regenerated by washing, or replacement of deteriorated catalysts with catalysts which have undergone regeneration treatment. Particularly when a honeycomb catalyst is used, a regenerated or un-regenerated $NO_x$ removal catalyst is placed such that the catalyst is inverted with respect to the direction of the flow of discharge gas, or a deteriorated $NO_x$ removal is replaced with a new $NO_x$ removal catalyst from which a deteriorated portion has been removed, whereby performance of the catalyst is restored. Notably, such restoration treatments are conceived on the basis of the finding of the present applicant that the upstream side of the discharge gas flow exclusively plays a great role in $NO_x$ removal reaction.

In the aforementioned embodiment, $NO_x$ removal catalysts of one flue gas $NO_x$ removal apparatus are managed by means of a single $NO_x$ removal catalyst management unit. Alternatively, $NO_x$ removal catalysts of a plurality of flue gas $NO_x$ removal apparatuses may also be managed by means of a single $NO_x$ removal catalyst management unit. Specifically, the percent $NO_x$ removal data obtained by the percent $NO_x$ removal determination means 18 may be transmitted in a wired or wireless manner to a central control system, whereby the percent $NO_x$ removal data are collectively controlled. Alternatively, concentration data obtained by $NO_x$ concentration measurement means 16A to 16E and $NH_3$ concentration measurement date 17A to 17E may be transmitted to a central control system, whereby the percent $NO_x$ removal data are collectively controlled. In any case, total performance evaluation of catalysts can be performed through collective management of a plurality of flue gas $NO_x$ removal apparatuses, thereby reliably attaining total management and effective performance management of $NO_x$ removal catalysts.

WORKING EXAMPLE

Table 1 shows the results of $NO_x$ concentration measurement and $NH_3$ concentration measurement on the inlet and outlet sides of four respective $NO_x$ removal catalyst layers (similar to FIG. 1) of a flue gas $NO_x$ removal apparatus installed in an actual thermal power station. The measurement was carried out seven times: 1st (starting), 2nd (about 2 months after starting), 3rd (about 5 months after starting), 4th (about 7 months after starting), 5th (about 12 months after starting), 6th (about 24 months after starting), and 7th (about 30 months after starting).

As mentioned above, percent $NO_x$ removal on the basis of $NO_x$ concentration of each catalyst layer was calculated from measured $NO_x$ concentrations and $NH_3$ concentrations, and the results are shown in Table 2. Percent $NO_x$ removal on the basis of $NH_3$ concentrations of each catalyst layer was calculated in a similar manner, and the results are shown in Table 3.

Measurement was also performed with respect to the case where a portion of the second $NO_x$ removal catalyst layer had been replaced with a regenerated catalyst (regenerated by washing with water; having catalytic performance equivalent to that of an unused product, confirmed by a performance test). In a similar manner, $NO_x$ concentration and $NH_3$ concentration were measured on the inlet and outlet sides of the replaced portion of the second catalyst layer. The results are also shown in Table 1. In addition, percent $NO_x$ removal on the basis of $NO_x$ concentration of each catalyst layer was calculated from measured $NO_x$ concentrations and $NH_3$ concentrations, and percent $NO_x$ removal on the basis of $NH_3$ concentrations of each catalyst layer was calculated in a similar manner. The results are shown in Tables 2 and 3, respectively.

COMPARATIVE EXAMPLE

Percent $NO_x$ removal and percent $NO_x$ removal contribution of each catalyst layer were calculated on the basis of the following equation (3):

$$\eta=\{(\text{inlet } NO_x-\text{outlet } NO_x)/(\text{inlet } NO_x)\}\times100 \quad (3),$$

from $NO_x$ concentrations measured on the inlet and outlet sides of the catalyst layer in the Working Example. Table 4 shows the results. This technique is based on the method disclosed in Japanese Patent Publication (kokoku) No. 7-47108.

TABLE 1

| | Measurement | 1st starting | 2nd 2 months after | 3rd 5 months after | 4th 7 months after | 5th 12 months after | 6th 24 months after | 7th 30 months after |
|---|---|---|---|---|---|---|---|---|
| $NO_x$ concentration (ppm) | 1st layer inlet | 148.7 | 166.6 | 208.3 | 228.1 | 221.6 | 166.7 | 175.9 |
| | 2nd layer inlet | 65 | 72.3 | 85.7 | 111.4 | 94.4 | 78.8 | 78.9 |
| | 3rd layer inlet | 44.6 | 46.4 | 44.7 | 51.8 | 48.6 | 47.6 | 44.0 |

TABLE 1-continued

|  | Measurement | 1st starting | 2nd 2 months after | 3rd 5 months after | 4th 7 months after | 5th 12 months after | 6th 24 months after | 7th 30 months after |
| --- | --- | --- | --- | --- | --- | --- | --- | --- |
|  | 4th layer inlet | 42.4 | 44.9 | 41.1 | 48.8 | 45.6 | 45.4 | 40.2 |
|  | 4th layer outlet | 39.4 | 39.4 | 36.9 | 44.2 | 43.3 | 42.3 | 38.0 |
| Ammonia concentration $NH_3$ (ppm) | 1st layer inlet | 106.3 | 110.4 | 151.2 | 146.8 | 147.0 | 117.3 | 139.1 |
|  | 2nd layer inlet | 23.9 | 25.9 | 31.8 | 36.2 | 46.1 | 28.9 | 37.0 |
|  | 3rd layer inlet | 3 | 4 | 2.8 | 2.9 | 6.9 | 4.0 | 5.0 |
|  | 4th layer inlet | 3.2 | 2.2 | 2.3 | 1.8 | 5.4 | 3.0 | 2.0 |
|  | 4th layer outlet | 0.7 | 1.8 | 0.7 | 0.5 | 1.7 | 0.5 | 0.8 |
| Regenerated layer (2nd layer) $NO_x$ concentration | 2nd layer inlet | 66.2 | 72.1 | 75.9 | 92.8 | 85.9 | 81.3 | 75.2 |
|  | 2nd layer outlet | 46.4 | 47.7 | 50.3 | 58.0 | 55.2 | 56.9 | 46.8 |
| Ammonia concentration $NH_3$ (ppm) | 2nd layer inlet | 24.1 | 27.8 | 29.5 | 36.4 | 39.9 | 28.4 | 41.9 |
|  | 2nd layer outlet | 6.8 | 9.2 | 9.1 | 11.2 | 16.1 | 10.4 | 10.5 |

TABLE 2

|  | Measurement | 1st starting | 2nd 2 months after | 3rd 5 months after | 4th 7 months after | 5th 12 months after | 6th 24 months after | 7th 30 months after |
| --- | --- | --- | --- | --- | --- | --- | --- | --- |
| Reduced to mole ratio 0.8 $NO_x$ | 1st layer | 63.0% | 68.3% | 64.9% | 63.6% | 69.2% | 59.9% | 55.8% |
|  | 2nd layer | 68.3% | 80.0% | 103.3% | 131.8% | 79.6% | 86.5% | 75.5% |
|  | 3rd layer | 58.7% | 30.0% | 101.6% | 81.5% | 34.9% | 42.7% | 60.2% |
|  | 4th layer | 75.0% | 200.0% | 147.6% | 201.2% | 33.1% | 82.7% | 90.9% |
| Regenerated layer (2nd layer) | $NO_x$ | 65.7% | 70.4% | 69.3% | 76.5% | 61.5% | 68.9% | 54.3% |

TABLE 3

|  | Measurement | 1st starting | 2nd 2 months after | 3rd 5 months after | 4th 7 months after | 5th 12 months after | 6th 24 months after | 7th 30 months after |
| --- | --- | --- | --- | --- | --- | --- | --- | --- |
| Reduced to mole ratio 0.8 $NH_3$ | 1st layer | 62.6% | 65.1% | 64.2% | 61.9% | 62.3% | 60.1% | 57.1% |
|  | 2nd layer | 69.4% | 71.6% | 84.9% | 96.3% | 73.2% | 75.1% | 71.8% |
|  | 3rd layer | −5.6% | 35.8% | 15.7% | 31.9% | 18.1% | 19.6% | 49.7% |
|  | 4th layer | 63.2% | 16.4% | 60.9% | 63.6% | 53.6% | 66.5% | 48.1% |
| Regenerated layer (2nd layer) | $NH_3$ | 59.6% | 58.2% | 59.4% | 61.8% | 51.9% | 55.1% | 57.7% |

TABLE 4

|  | Measurement | 1st starting | 2nd 2 months after | 3rd 5 months after | 4th 7 months after | 5th 12 months after | 6th 24 months after | 7th 30 months after |
| --- | --- | --- | --- | --- | --- | --- | --- | --- |
| Total percent $NO_x$ removal |  | 73.5% | 76.4% | 82.3% | 80.6% | 80.4% | 74.6% | 78.4% |
| Percent contribution | 1st layer | 76.6% | 74.1% | 71.5% | 63.4% | 71.3% | 70.7% | 70.3% |
|  | 2nd layer | 18.7% | 20.4% | 23.9% | 32.4% | 25.7% | 25.1% | 25.3% |
|  | 3rd layer | 2.0% | 1.2% | 2.1% | 1.6% | 1.7% | 1.7% | 2.7% |
|  | 4th layer | 2.7% | 4.3% | 2.5% | 2.5% | 1.2% | 2.5% | 1.6% |
|  | Total | 100.0% | 100.0% | 100.0% | 100.0% | 100.0% | 100.0% | 100.0% |

<Performance Evaluation>

As is clear from Tables 1 to 4, percent $NO_x$ removal values of the third layer and the fourth layer calculated on the basis of only $NO_x$ concentrations (Comparative Example) are very small from the first measurement. The Test Example mentioned below has revealed that these small values do not reflect the actual states of the catalyst layers.

In contrast, according to the method of the Working Example employing mole ratios ($NH_3/NO_x$) (inlet mole ratio and evaluation mole ratio), percent $NO_x$ removal values on the basis of $NH_3$ concentrations and those on the basis of $NO_x$ concentrations were found to assess the actual states of the catalyst layers.

Through statistical processing of the data shown in Tables 2 and 3 of the Working Example so as to determine variation in a specific data set, percent $NO_x$ removal values calculated on the basis of $NH_3$ concentrations were found to have less variation. This was confirmed through the following procedure.

In the Working Example, since the evaluation mole ratio was set to 0.8, the theoretical percent $NO_x$ removal was 0 to 80% on the basis of the evaluation mole ratio. The incident of the values falling outside the above range was counted in Tables 2 and 3. Table 5 shows the results.

A simple average was calculated for percent $NO_x$ removal values obtained from the first measurement to seventh measurement shown in Tables 2 and 3, and the incident of the simple average values exceeding the theoretical percent $NO_x$ removal was counted. The results are shown in Table 6.

From the data in Tables 2 and 3, unbiased variance in percent $NO_x$ removal of each catalyst layer was calculated, and the obtained variance values were averaged. The percent $NO_x$ removal values falling outside the theoretical range were removed from the data shown in Tables 2 and 3, and approximate equations were derived from the remaining data through the least squares method. Pearson's product-moment correlation coefficients of the equations (r), $r^2$ (RSQ), and averaged values thereof were calculated. Table 7 shows the results.

TABLE 5

| Catalyst layers | Outside the theoretical range | |
|---|---|---|
| | $NH_3$ | $NO_x$ |
| 1st layer | 0 | 0 |
| 2nd layer | 2 | 3 |
| 3rd layer | 1 | 2 |
| 4th layer | 0 | 5 |
| 2nd layer (regenerated) | 0 | 0 |
| Total | 3 | 10 |

TABLE 6

| Catalyst layers | Average | |
|---|---|---|
| | $NH_3$ | $NO_x$ |
| 1st layer | 61.9% | 63.5% |
| 2nd layer | 77.5% | 89.3% |
| 3rd layer | 23.6% | 58.5% |
| 4th layer | 53.2% | 118.6% |
| 2nd layer (regenerated) | 57.7% | 66.7% |
| Outside the theoretical range | 0 | 2 |

TABLE 7

| Catalyst layers | Variance | | $r^2$ (RSQ)/least squares method | |
|---|---|---|---|---|
| | $NH_3$ | $NO_x$ | $NH_3$ | $NO_x$ |
| 1st layer | 0.0007 | 0.0022 | 0.812 | 0.537 |
| 2nd layer | 0.0094 | 0.0470 | 0.034 | 0.028 |
| 3rd layer | 0.0310 | 0.0668 | 0.302 | 0.027 |
| 4th layer | 0.0304 | 0.4260 | 0.031 | 0.168 |
| 2nd layer (regenerated) | 0.0011 | 0.0050 | 0.167 | 0.351 |
| Average | 0.0145 | 0.1094 | 0.269 | 0.222 |

As is clear from Table 5, the incident of values falling outside the theoretical percent $NO_x$ removal range is larger in $NO_x$ than in $NH_3$.

As is clear from Table 6, the incident of simple average values falling outside the theoretical percent $NO_x$ removal range is larger in $NO_x$ than in $NH_3$.

As is clear from Table 7, variance in $NO_x$-based percent $NO_x$ removal values is larger than variance in $NH_3$-based percent $NO_x$ removal values. From Table 7, the averaged RSQ in relation to the least squares method is greater in the case of $NH_3$ than in the case of $NO_x$, indicating that $NH_3$-based percent $NO_x$ removal values have high correlation. In the cases of the fourth layer and the regenerated second layer, RSQ values are lower in the case of $NH_3$ than in the case of $NO_x$. However, these values were obtained at unsatisfactory measurement precision, and the averaged correlation value is higher in the case of $NH_3$. Therefore, $NH_3$-basis data are concluded to have less variance.

As is clear from Tables 5 to 7, time-dependent change in percent $NO_x$ removal of each $NO_x$ removal catalyst layer is smaller in the case of $NH_3$-concentration-basis percent $NO_x$ removal values than in the case of $NO_x$-concentration-basis percent $NO_x$ removal values.

From the $NH_3$-concentration-basis percent $NO_x$ removal values shown in Table 3, the percent $NO_x$ removal values falling outside the theoretical range were removed, and approximate equations were derived from the data falling within the theoretical range through the least squares method. On the basis of these approximate equations, percent $NO_x$ removal of each catalyst layer (12 months after the start of measurement) was calculated. Table 8 shows the results.

TABLE 8

| Catalyst layers | 5th (after 12 months) |
|---|---|
| 1st layer | 62% |
| 2nd layer | 74% |
| 3rd layer | 28% |
| 4th layer | 60% |
| 2nd layer (regenerated) | 58% |

As is clear from Table 8, the most deteriorated $NO_x$ removal catalyst layer is estimated to be the third layer. At the fifth point in time of measurement, the degree of deterioration has been found to be in the sequence of the third layer, the regenerated second layer, the fourth and the first layers (approximately equal to each other), and the second layer.

In contrast, the results of the Comparative Example appear to indicate that the percent contribution of the first layer decreased and that of the second layer increased, thereby maintaining the performance of the NO$_x$ removal apparatus. That is, the first layer is concluded to be deteriorated.

TEST EXAMPLE

A portion of each of the catalyst layers employed in the Working Example was sampled, and the sample was evaluated in performance through the following method.

A portion (50 mm×50 mm×100 mm in length) was cut from the inlet side of the each NO$_x$ removal catalyst layer, and set in a performance test machine. The test gas was fed under the conditions which match the design values of an actual NO$_x$ removal apparatus, and percent NO$_x$ removal was determined by measuring NO$_x$ concentration and NH$_3$ concentration on the outlet side of the catalyst sample. The results are shown in Table 9.

The results indicate a certain degree of deterioration of catalyst layers, and are almost identical to the aforementioned deterioration evaluation results.

As is clear from the above results, performance evaluation of NO$_x$ removal catalysts carried out in the Working Example reflects actual deterioration status; however, performance evaluation carried out in the Comparative Example does not coincide with actual performance evaluation.

TABLE 9

| Catalyst layers | 1st layer | 2nd layer | 3rd layer | 4th layer | 2nd layer (regenerated) |
|---|---|---|---|---|---|
| Percent NO$_x$ removal | 78.5% | 80.2% | 69.1% | 79.4% | 77.7% |
| Order of deterioration | 3 | 5 | 1 | 4 | 2 |

The invention claimed is:

1. A NO$_x$ removal catalyst management unit comprising:
    a NO$_x$ measurement means for determining NO$_x$ concentrations on the inlet and outlet sides of respective NO$_x$ removal catalyst layers;
    a NH$_3$ measurement means for determining NH$_3$ concentrations on the inlet and outlet sides of the same NO$_x$ removal catalyst layers; and
    a percent NO$_x$ removal determination means for determining percent NO$_x$ removal ($\eta$) on the basis of an inlet mole ratio (i.e., inlet NH$_3$/inlet NO$_x$), which percent NO$_x$ removal ($\eta$) is determined on the basis of the following equation (1):

$$\eta = \left( \frac{(\text{inlet NH}_3 - \text{outlet NH}_3)}{(\text{inlet NH}_3 - \text{outlet NH}_3 + \text{outlet NO}_x)} \right) \times 100 \times \frac{\text{evaluation mole ratio}}{\text{inlet mole ratio}} \quad (1)$$

wherein:
    the inlet mole ratio is derived from a NO$_x$ concentration as measured on the inlet side by means of said NO$_x$ measurement means and an NH$_3$ concentration as measured on the inlet side by means of said NH$_3$ measurement means;
    the inlet NH$_3$ concentration is an NH$_3$ concentration as measured on the inlet side;
    the outlet NH$_3$ concentration is an NH$_3$ concentration as measured on the outlet side;
    the outlet NO$_x$ concentration is a NO$_x$ concentration as measured on the outlet side; and
    the evaluation mole ratio is predetermined for the purpose of evaluating respective NO$_x$ removal catalyst layers or plurality of NO$_x$ catalyst layers.

2. A NO$_x$ removal catalyst management unit according to claim 1, which management unit further includes transmission means for transmitting concentration values determined by the NO$_x$ measurement means and the NH$_3$ measurement means to the percent NO$_x$ removal determination means, wherein the percent NO$_x$ removal determination means determines the percent NO$_x$ removal ($\eta$) of respective NO$_x$ removal catalyst layers included in a plurality of flue gas NO$_x$ removal apparatuses.

3. A method for managing a NO$_x$ removal catalyst comprising:
    determining NO$_x$ concentrations and NH$_3$ concentrations on the inlet and outlet sides of respective NO$_x$ removal catalyst layers;
    determining percent NO$_x$ removal ($\eta$) on the basis of an inlet mole ratio (i.e., inlet NH$_3$/inlet NO$_x$); which percent NO$_x$ removal ($\eta$) is determined on the basis of the following equation (1):

$$\eta = \left( \frac{(\text{inlet NH}_3 - \text{outlet NH}_3)}{(\text{inlet NH}_3 - \text{outlet NH}_3 + \text{outlet NO}_x)} \right) \times 100 \times \frac{\text{evaluation mole ratio}}{\text{inlet mole ratio}} \quad (1)$$

wherein:
    the inlet NH$_3$ concentration is an NH$_3$ concentration as measured on the inlet side;
    the outlet NH$_3$ concentration is an NH$_3$ concentration as measured on the outlet side;
    the outlet NO$_x$ concentration is a NO$_x$ concentration as measured on the outlet side;
    the inlet mole ratio is derived from a NO$_x$ concentration as measured on the inlet side and an NH$_3$ concentration as measured on the inlet side; and
    an evaluation mole ratio is predetermined for the purpose of evaluating respective NO$_x$ removal catalyst layers or plurality of NO$_x$ catalyst layers; and
    evaluating performance of respective NO$_x$ removal catalyst layers on the basis of the percent NO$_x$ removal ($\eta$).

4. A method according to claim 3 for managing a NO$_x$ removal catalyst, wherein the method further comprises performing restoration treatment of a NO$_x$ removal catalyst layer having a catalytic performance deteriorated to a predetermined level, on the basis of results of performance evaluation of the respective NO$_x$ removal catalyst layers.

5. A method according to claim 4 for managing a NO$_x$ removal catalyst, wherein the performance restoration treatment is replacement of the NO$_x$ removal catalyst layer with a new NO$_x$ removal catalyst layer, replacement of the NO$_x$ removal catalyst layer with a regenerated NO$_x$ removal catalyst layer, replacement of the NO$_x$ removal catalyst layer with an NO$_x$ removal catalyst layer inverted with respect to the direction of the flow of discharge gas, or replacement of the NO$_x$ removal catalyst layer with an NO$_x$ removal catalyst layer from which a deteriorated portion has been removed.

6. A method according to any of claims 3 and 4 for managing a NO$_x$ removal catalyst, wherein the method further comprises determining the percent $NO_x$ removal of respective $NO_x$ removal catalyst layers included in a plurality of flue gas $NO_x$ removal apparatuses and evaluating catalytic performance of respective $NO_x$ removal catalyst layers included in a plurality of flue gas $NO_x$ removal apparatuses.

7. A method according to claim 5 for managing a $NO_x$ removal catalyst, wherein the method further comprises determining the percent $NO_x$ removal of respective $NO_x$ removal catalyst layers included in a plurality of flue gas $NO_x$ removal apparatuses and evaluating catalytic performance of respective $NO_x$ removal catalyst layers included in a plurality of flue gas $NO_x$ removal apparatuses.

* * * * *